(12) United States Patent
Jeong

(10) Patent No.: US 11,520,639 B2
(45) Date of Patent: Dec. 6, 2022

(54) METHOD FOR ALLOCATING AND MANAGING CLUSTER RESOURCE ON CLOUD PLATFORM

(71) Applicants: NAMU TECH CO., LTD., Seongnam-si (KR); ACORNSOFT CO., LTD., Seoul (KR)

(72) Inventor: Cheol Jeong, Seoul (KR)

(73) Assignee: NAMU TECH CO., LTD., Seoul (KR)

( * ) Notice: Subject to any disclaimer, the term of this patent is extended or adjusted under 35 U.S.C. 154(b) by 86 days.

(21) Appl. No.: 17/257,484

(22) PCT Filed: Jul. 15, 2019

(86) PCT No.: PCT/KR2019/008697
§ 371 (c)(1),
(2) Date: Dec. 31, 2020

(87) PCT Pub. No.: WO2020/017843
PCT Pub. Date: Jan. 23, 2020

(65) Prior Publication Data
US 2021/0124624 A1    Apr. 29, 2021

(30) Foreign Application Priority Data

Jul. 19, 2018 (KR) .................. 10-2018-0084013

(51) Int. Cl.
*G06F 9/50* (2006.01)
(52) U.S. Cl.
CPC .......... *G06F 9/5083* (2013.01); *G06F 9/5044* (2013.01); *G06F 9/5077* (2013.01)
(58) Field of Classification Search
CPC .... G06F 9/5083; G06F 9/5044; G06F 9/5077; G06F 2209/503; G06F 9/5072
See application file for complete search history.

(56) References Cited

U.S. PATENT DOCUMENTS

| 7,900,206 B1* | 3/2011 | Joshi ............... G06F 11/2035 714/48 |
| 2017/0264449 A1* | 9/2017 | Seetharaman ...... H04L 12/1818 |
| 2018/0020073 A1* | 1/2018 | Boss .................... H04L 43/091 |

FOREIGN PATENT DOCUMENTS

| KR | 10-2014-0086436 A | 7/2014 |
| KR | 10-2014-0117965 A | 10/2014 |

(Continued)

*Primary Examiner* — Sisley N Kim
(74) *Attorney, Agent, or Firm* — Novick, Kim & Lee PLLC; Jae Youn Kim

(57) ABSTRACT

The present invention provides a method for allocating and managing a cluster resource on a cloud platform, the method comprising the steps of: generating service group information, by means of a cloud platform system, when a cluster resource allocation request is input; adding/deleting a user of the service group; selecting a cluster to be allocated to the user of the service group and inputting allocation information; querying a cluster resource availability; registering resource allocation information in the service group and allocating a resource to complete cluster resource allocation, when the resource is available as a result of the querying of the cluster resource availability; checking whether a cluster resource can be added when the resource is insufficient as a result of the querying of the cluster resource availability; registering the further cluster resource when the cluster resource can be added; registering resource allocation information in the service group and allocating the resource to complete cluster resource allocation; and reselecting an available cluster when the cluster resource cannot be added.

3 Claims, 21 Drawing Sheets

(56) References Cited

FOREIGN PATENT DOCUMENTS

| KR | 10-1582751 B1 | 1/2016 |
| KR | 10-1807806 B1 | 12/2017 |
| KR | 10-1826498 B1 | 2/2018 |
| KR | 10-1858715 B1 | 5/2018 |
| KR | 10-1987661 B1 | 6/2019 |

* cited by examiner

FIG. 11

METHOD FOR ALLOCATING AND MANAGING CLUSTER RESOURCE ON CLOUD PLATFORM

TECHNICAL FIELD

The present invention relates to a method for allocating and managing a cluster resource on a cloud platform, and more particularly, to a method for allocating and managing a cluster resource on a cloud platform capable of efficiently allocating and managing the cluster resource.

BACKGROUND ART

Cloud is referred to as 'a service provider server' depending on the practices that displays a computing service provider server in a cloud shape. Only when the cloud stores software and data in a central computer connected to the Internet to access the Internet, the data may be used anytime and anywhere.

The cloud may be divided into Software as a Service (SaaS) which is an application service provided to multiple users with on-demand, such as Salesforce.com, Google e-mail, etc., Platform as a Service (PaaS) which is a software stack required for execution of developing platforms or applications such as AWS RDS, Google AppEngine, etc., and Infrastructure as a Service (IaaS) providing a server or storage to a user in a service form such as AWS EC2, according to a service providing form.

In addition, the cloud may be divided into a private cloud operated only for only one group, a public cloud rendered through an open network for public use, and a hybrid cloud as a combination of two or more clouds which have distinct identities, but are bound together, according to introducing and deploying forms.

Meanwhile, in case of an enterprise cloud, it is more important to customize and optimize a technology and an infrastructure based on an application service with a cloud implementing the business and IT strategy of a company, and it should be easy to configure or deploy the application in various infrastructures. In addition, a technology for allocating and managing the resource of the cluster in which the application can operate is required.

DISCLOSURE

Technical Problem

Accordingly, the present invention is derived to solve the above problems, and an object of the present invention is to provide a method for allocating and managing a cluster resource on a cloud platform capable of efficiently allocating and managing the cluster resource.

However, technical objects of the present disclosure are not limited to the objects mentioned above. Unmentioned other technical objects will be apparently appreciated by those skilled in the art from the following description.

Technical Solution

According to an embodiment of the present invention, a method for allocating and managing a cluster resource on a cloud platform, the method includes the steps of: generating service group information, by means of a cloud platform system, when a cluster resource allocation request is input; adding/deleting a user of the service group, by means of the cloud platform system; selecting a cluster to be allocated to the user of the service group and inputting allocation information; querying a cluster resource availability, by means of the cloud platform system; registering resource allocation information in the service group and allocating a resource to complete cluster resource allocation, by means of the cloud platform system, when the resource is available as a result of the querying of the cluster resource availability; checking whether a cluster resource is added, by means of the cloud platform system, when the resource is insufficient as a result of the querying of the cluster resource availability; registering further the cluster resource, by means of the cloud platform system, when the cluster resource is able to be added; registering resource allocation information in the service group and allocating the resource to complete cluster resource allocation, by means of the cloud platform system; and reselecting an available cluster when the cluster resource is not able to be added.

The method may further include the steps of: registering an application resource usage for using the cluster resource; querying a cluster resource availability, by means of the cloud platform system; allocating and operating an application resource, by means of the cloud platform system, when the resource is able to be used; updating residual resource allocation information, by means of the cloud platform system; and completing the use of the cluster resource.

The method may further include the steps of: terminating an application for returning the cluster resource; recovering an allocation resource, by means of the cloud platform system; updating cluster available resource information, by means of the cloud platform system; and completing the returning of the cluster resource.

Advantageous Effects

According to the present invention, the method for allocating and managing the cluster resource on the cloud platform has an effect of efficiently allocating and managing the cluster resource.

DESCRIPTION OF DRAWINGS

FIGS. 6 to 11 illustrate schematically functions of a development/operation unit of FIG. 1.

MODES FOR THE INVENTION

Figure 1:
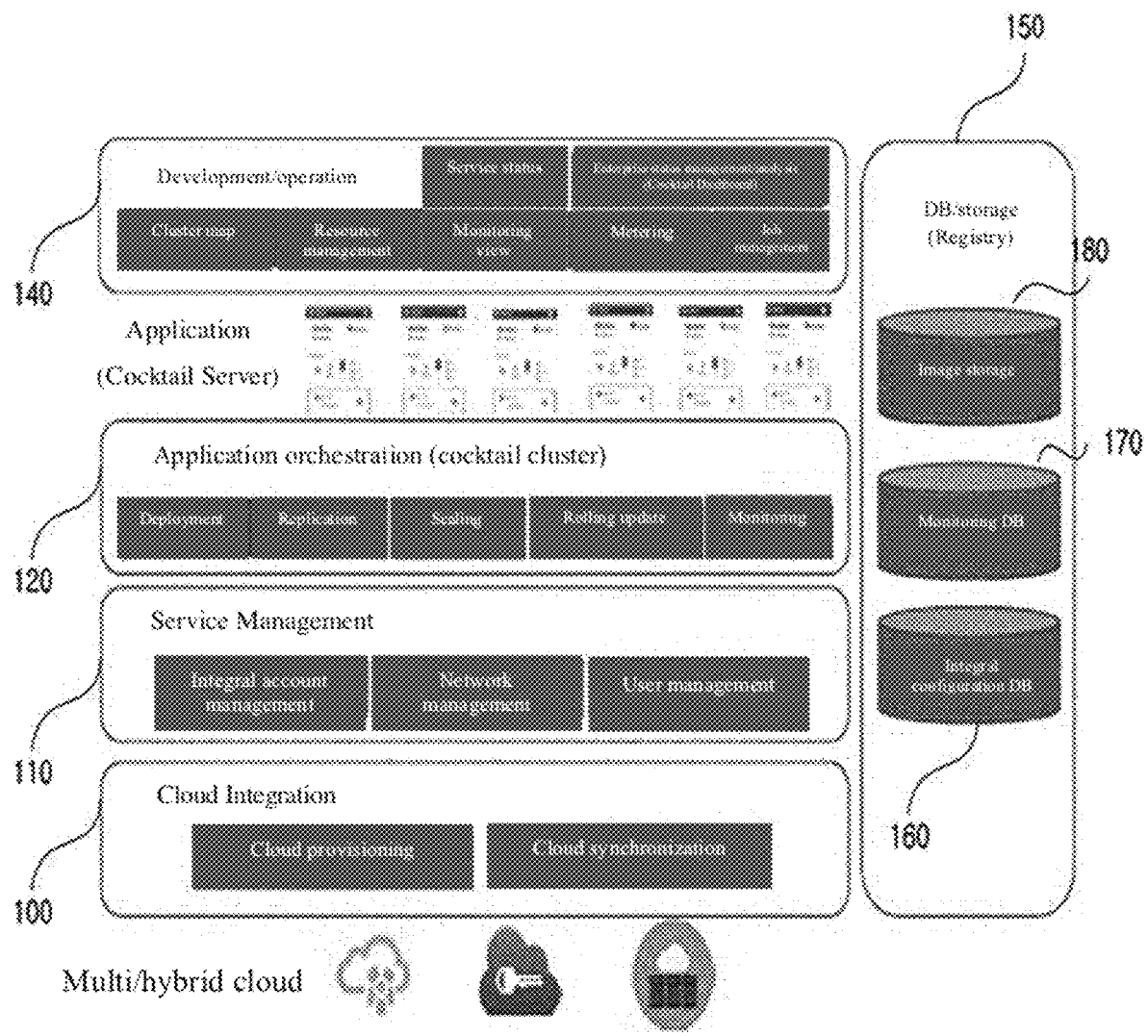
FIG. 1 illustrates a configuration diagram of a cloud platform system according to an embodiment of the present invention.

Advantages and features of the present disclosure, and methods for accomplishing the same will be more clearly understood from exemplary embodiments described in detail below with reference to the accompanying drawings. However, the present invention is not limited to the embodiments set forth below, and may be embodied in various different forms. The present embodiments are just for rendering the disclosure of the present invention complete and are set forth to provide a complete understanding of the scope of the invention to a person with ordinary skill in the technical field to which the present invention pertains, and the present invention will only be defined by the scope of the claims.

Like reference numerals refer to like elements throughout the specification.

Hereinafter, a cloud platform system according to an embodiment of the present invention will be described with reference to the accompanying drawings.

Figure 2:
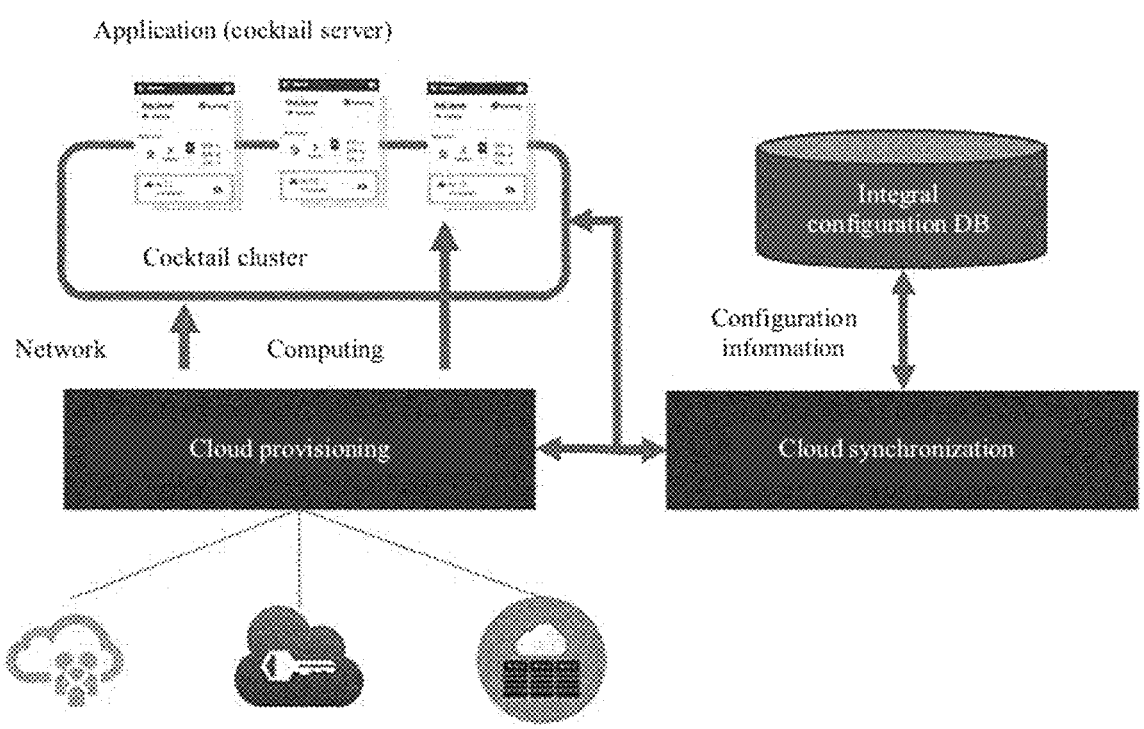
FIG. 2 illustrates schematically a function of a cloud integration unit of FIG. 1.
Figure 3:
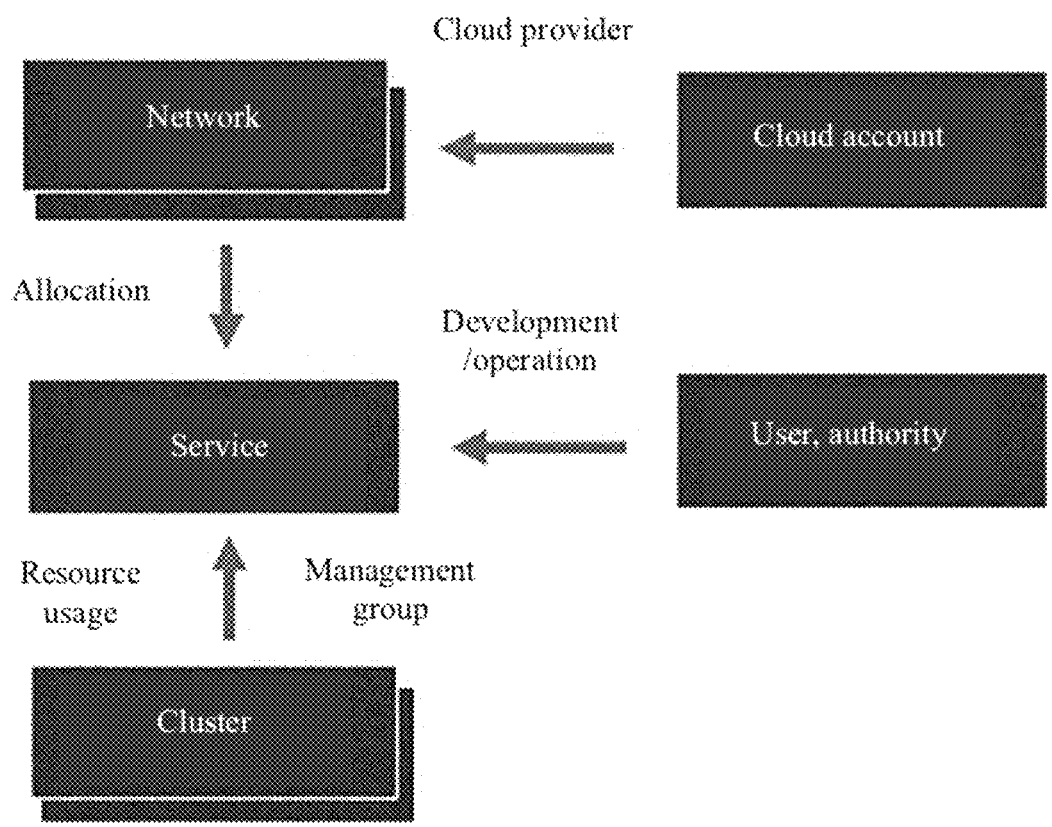
FIG. 3 illustrates schematically a function of a service management unit of FIG. 1.
Figure 4:
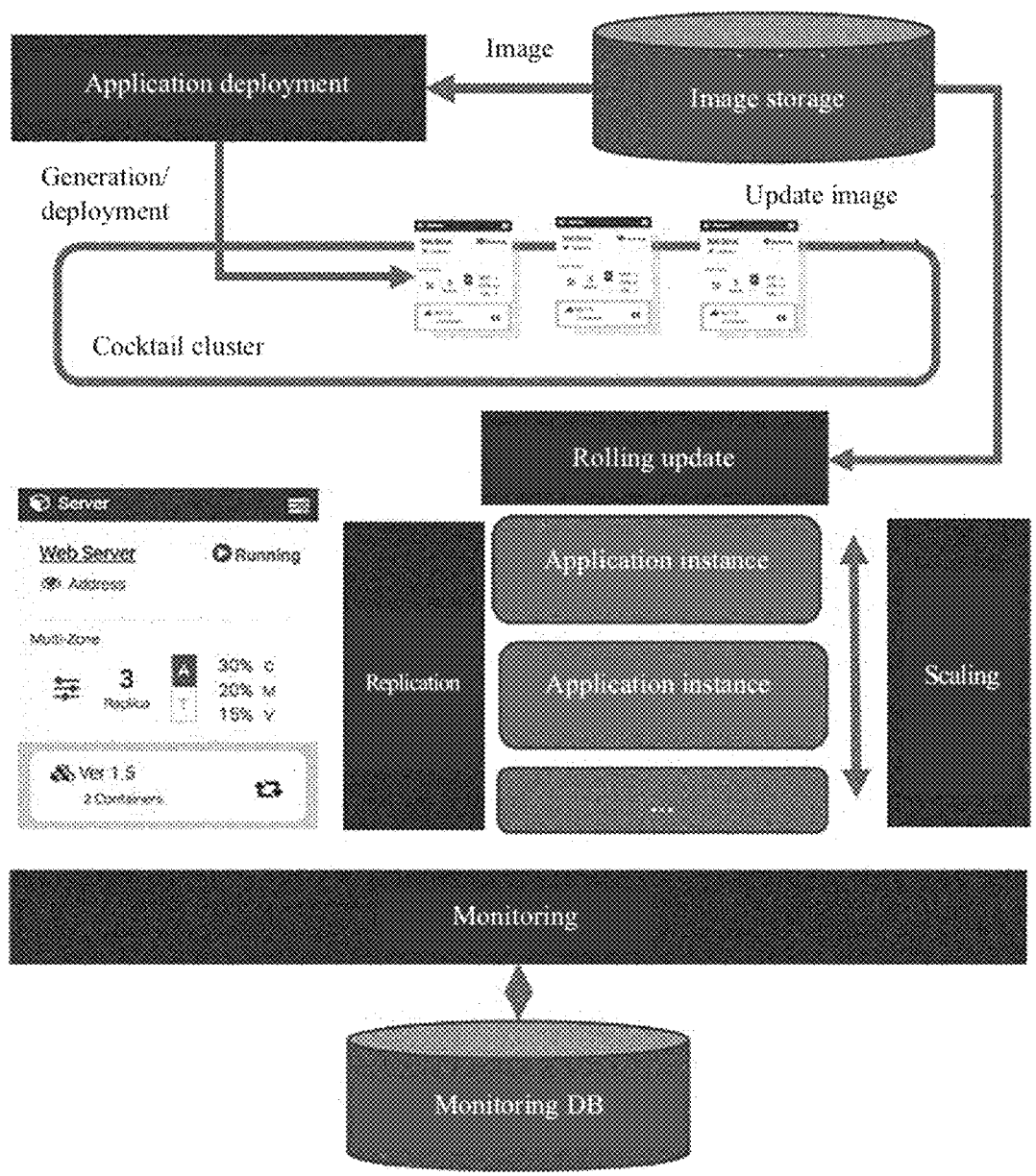
FIG. 4 illustrates schematically a function of an application orchestration unit of FIG. 1.

FIG. 1 illustrates a configuration diagram of a cloud platform system according to an embodiment of the present invention, FIG. 2 illustrates schematically a function of a cloud integration unit of FIG. 1, FIG. 3 illustrates schematically a function of a service management unit of FIG. 1, and FIG. 4 illustrates schematically a function of an application orchestration unit of FIG. 1.

Figure 5:
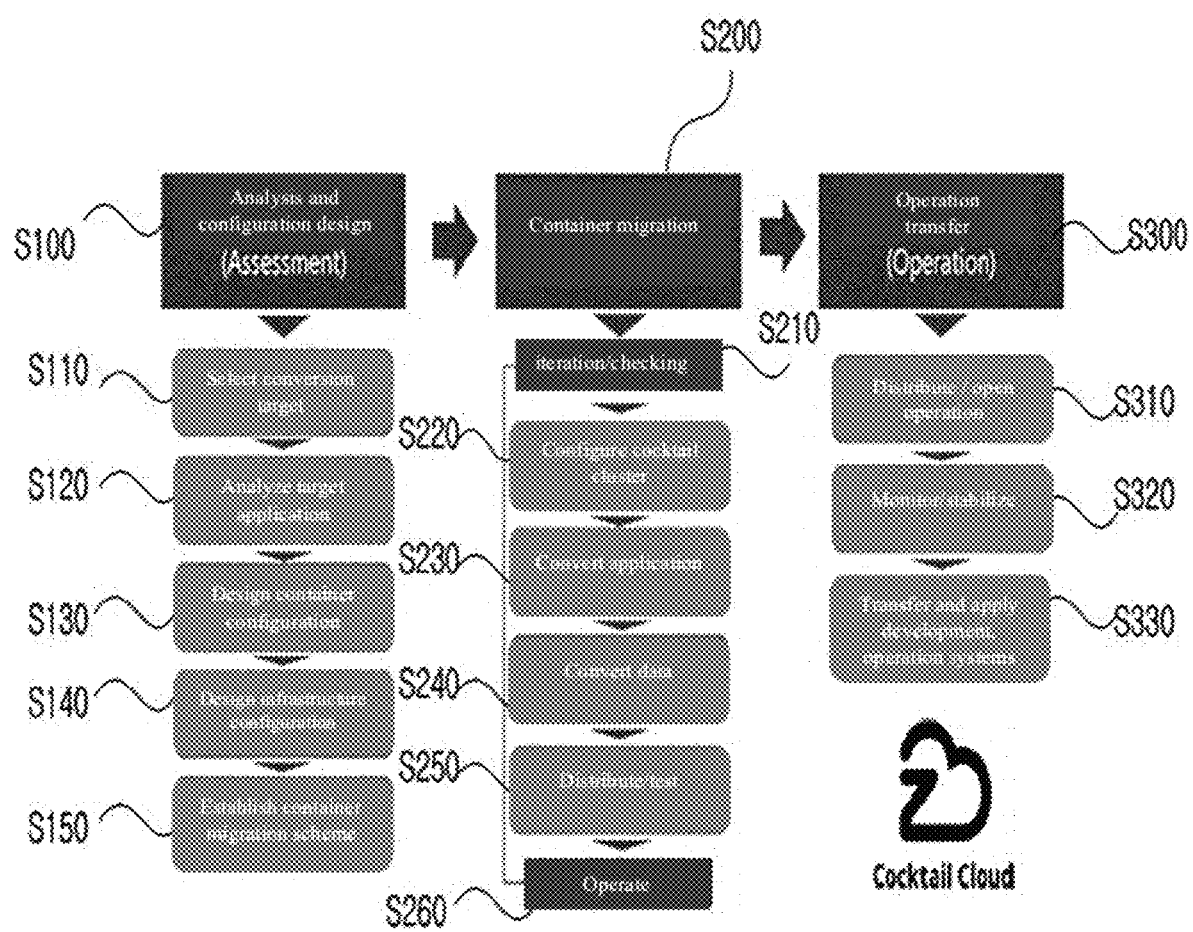
FIG. 5 illustrates a framework for application containerizing according to one embodiment of the present invention.

FIG. 5 illustrates a framework for application containerizing according to one embodiment of the present invention and FIGS. 6 to 11 illustrate schematically functions of a development/operation unit of FIG. 1.

A cloud platform system of FIG. 1 provides a view and a tool for ensuring the availability and extendability of applications and efficienating development and operation based on integration management of a multi/hybrid cloud. Hereinafter, a cloud platform system of the present invention is referred to as a "cocktail cloud".

Referring to FIG. 1, a cocktail cloud includes a cloud integration unit 100, a service management unit 110, an application orchestration unit 120, a development/operation unit 140 (DevOps View), and a DB/storage 150.

The cloud integration unit 100 serves to automatically configure an infrastructure of a multi/hybrid cloud to provide the configured infrastructure to an application and synchronize configuration information for management.

The cloud integration unit 100 performs cloud provisioning and cloud synchronization functions.

Referring to FIG. 2, the cloud provisioning function is a function of configuring and providing a cloud network infrastructure to an application cluster (cocktail cluster) and configuring and providing a computing infrastructure of the cloud to the application. In addition, a physical infrastructure (Bare Metal) provides a cluster configuration tool. A support cloud may include AWS.Azure.Aliyun.Google Computing Engine for Public, Openstack.VMWear for private, and On-premise.Datacenter BareMetal Infra.

The cloud synchronization function is a function of storing and managing cloud infrastructure configuration information in an integral configuration DB 160 and synchronizing infrastructure change information with the integral configuration DB 160 when operating.

The service management unit 110 serves to allocate and manage a cloud account and a user and a network resource to a logic group of managing an application cluster. That is, the service management unit 110 performs an integrated account management function, a network management function, and a user management function.

Referring to FIG. 3, the integrated account management (Cloud Provider) function is a function of integrally managing a multi-cloud account and access information and being used for a network and a cloud providing function.

The network management function is a function of configuring a cloud network and allocating the configured cloud network to a service. For example, the cocktail server may be VPC•Subnet of AWS. One service generates a cluster using a network of a provider of a multi-cloud to configure and operate the application.

The user management function is a function of managing team members managing services and authority required for development/operation. Here, the authority may include enterprise service management authority (Admin), enterprise service injury authority (Manager), service management authority (DevOps) allocated to members, etc. The user may participate as a member on several services.

The application orchestration unit 120 plays a key function of a cocktail cluster as a function of ensuring the deployment, availability, and extendability of applications.

The application orchestration unit 120 performs an application deployment function, a replication control function, a rolling update function, a scaling function, and a monitoring function.

Referring to FIG. 4, the application deployment function is a function of providing easiness without requiring a separate setting and a configuration operation with container image-based deployment and automatically provisioning a cloud infrastructure upon the application deployment.

Here, the application is to be containerized and deployed, and the application container (hereinafter, referred to as a "container") means an independent system on the OS which allocates, isolates, and visualizes host resources in an application process.

The core technology used in the container is a control group (cgroup) and a namespace of Linux. The cgroup makes a corresponding process group and performs allocation and management of resources in order to allocate the host resource to the process on the OS. The namespace is a technique to isolate a process, a network, and a mount to a specific name space. Accordingly, the container means an independent system which allocates resources to the application process via the cgroup and is virtualized on the OS isolated by the namespace.

The container is a technique suitable for application virtualization which has almost no consumption of host resources and a very small time required for starting as a light OS visualization method without using a hypervisor (hardware emulator) and a guest OS. Further, the container can be independently configured and deployed to an infrastructure such as a physical server (Bare Metal) and a virtual server (Virtual Machine) by virtualization on the OS.

To convert the existing or new application configuration to a container, a containerization process should be involved.

In addition, the conversion of development, testing, and operation methods should be parallel with a process of optimizing an operation infrastructure configuration (cocktails cloud platform).

In order to convert the existing application to the container, the settings of the application and the conversion of a configuration rather than the source are required. Considering deployment and operation efficiency, a role-specific independent configuration based on a workload is general and a configuration considering multiplexing and scaling through the replication needs to be designed and applied.

For conversion of development, testing, and operation of the application, an application configuration needs to be standardized by building, testing, and deployment of an image-based application, and a base image.

In order to optimize the operation infrastructure configuration of the application container, a cluster-based infrastructure for a container orchestration is configured, a computing capacity considering replication and scaling needs to be calculated (minimizing a spare capacity, and easiness of expansion as necessary), and related infrastructures such as share, storage, security, and a network need to be configured.

Referring to FIG. 5, containerization is divided into analysis and configuration design (S100), container conversion (S200), and operating transfer (S300).

A container conversion target is selected from existing applications by considering container/cloud introducing purposes and strategies for the analysis and configuration design (S100) (S110).

When the target application is selected, the target application is analyzed (S120). At this time, an application status and data such as applications, infrastructures, data, applications and associated structures are examined, and the needs of development and operation managers are collected. In addition, a container configuration direction, issues and solutions are derived.

In addition, considering the separation/integration, association, availability, extendibility, security, etc., a target application-specific container configuration is designed (S130). At this time, an image build template such as a base image, environment variables, including items, and commands may be defined.

Then, an infrastructure configuration is designed (S140). A conversion infrastructure (Cloud/Bare Metal) provider is selected, and a capacity for each application container is selected. In addition, the number of container cluster nodes and an infrastructure capacity are calculated and storage, network and security configurations are designed.

When the infrastructure configuration is designed, a container conversion scheme is established (S150). At this time, a detailed conversion scheme for each application is established, the conversion work and organization/role are defined, and a conversion schedule is established. In addition, reporting and feedback are reflected.

An iterative/incremental conversion (S210) is required for the container conversion (S200). A pre-test (PoC), an application-specific graded conversion, etc. are iteratively and incrementally converted.

In order to configure the cocktail cluster (S220), a cocktail cloud platform is installed and configured, and an infrastructure such as a network, a shared storage, and security is configured (provisioning in the cocktail in the case of the cloud). A cocktail service and a cluster are generated by allocation of the infrastructure and user registration and a cluster configuration is verified.

In addition, for application conversion (S230), an application container is configured and application settings and source are changed if necessary. The functions and settings of the conversion container are verified and registered in a container deployment image build and registry. A cocktail server is generated and tested.

For data conversion (S240), a target application container is converted, a cocktail server is configured by a persistence volume setting and the like, and data is extracted and transmitted to the cocktail server. If the DB solution is applied, data conversion is performed and data integrity is checked. In the case of the operation application, in order to minimize a downtime, a data synchronization solution is applied.

Thereafter, the verified container is deployed to the cocktail server, an application function and a performance test are performed, and the testing result is reflected to the container and the infrastructure (S250 and S260).

For operation transfer (S300), operation deployment/open (S310) is performed, and specifically, an operation cocktail cluster is generated and a cocktail server is generated based a conversion-completed image to be associated and configured. In addition, operation data is transferred and an application is opened. A technique of deploying, operating, and managing the application container is referred to as a container orchestration.

The container orchestration is a technique of deploying, operating, and managing the application container by configuring a managed cluster in a physical/virtual infrastructure, and has been cloudified in the existing offices and the data center infrastructures and spread into an application management platform of the private/public cloud by using advantages of light and fast starting and mobility of the container.

The operation monitoring of the application and the infrastructure is performed by the cocktail cloud monitoring view and performance issues and errors are reflected (S320).

For development/operating system transfer and application (S330), the container transfer result is reported, a container-based development/operation system training is conducted in an organization responsible for the development and operation, and a cocktail cloud platform usage training is conducted.

Accordingly, the container has the following advantages.

First, the container has the independence.

The container is an isolated application execution environment, independent resources are allocated (CPU, Memory, Disk, Network, etc.), and multiple applications are operated on the same host.

Second, the container implements a light virtualization.

The container enables an OS-level virtualization (Non Hypervisor), allows fast handling (generation, execution, restarting, etc.), and enables efficient deployment and updating with a small size of container image.

Third, the container has mobility.

The container has an infrastructure independent image, is movable anywhere such as a Bare Metal, a virtual machine, and a cloud, enables online deployment and version management by an image registry, and supports a main host OS (Linux series, Windows). The mobility of the container enhances productivity and efficiency of the application operation/development under a multi/hybrid cloud environment, and specifically, solves the difficulty in application deployment and transfer in a heterogeneous infrastructure with a standardized container image and solves a lock-in problem dependent on a specific cloud.

The replication function is faster and more efficient than OS rebooting as a method of maintaining a specified initial replication number (multiplexing) for the stability and availability of the application and restarting when an error occurs through an application container health check. The replicated application is serviced through load balancing.

The rolling update function is a function of performing an update operation such as deployment and infrastructure change without stopping the application service and configuring automation through a job management function of DevOps View when there is dependency between multiple applications.

The scaling function is a function of in/out scaling of an instance through the monitoring of the application and up/down scaling of a resource capacity in the case of the application infrastructure. In addition, scaling automation is configured through monitoring information.

The monitoring function is a function of monitoring an application instance (container+infrastructure), and generating and managing an alarm through a threshold setting.

The development/operation unit (DevOps View) 140 includes a service status function, a cluster map function, a monitoring view function, a resource management function, a metering function, a job management function, and an enterprise status management/analysis function. The respective functions will be described below with reference to FIGS. 6 to 11.

Figure 6:

The service status function provides a view that may determine a status of all application clusters of the cocktail cloud based on the service (see FIG. 6). Then, items of a service status, a cluster status, a monitoring alarm, etc. may be displayed.

In the service status, it is possible to query the entire service status of the cocktail cloud and determine a cloud provider, a cluster, a server, a cloud component, current monthly using cost, etc. by synthesizing a configuration status of the cluster in the service. Here, the cluster means a configuration unit of the application and the service means a logical group of the cluster.

In the cluster status, a provider, a region, a server, a cloud component, and monthly using cost can be queried in a card form, and in the physical (Bare Metal) cluster, the using cost may be excluded.

In the monitoring alarm display function, when an alarm occurs in the application and the infrastructure of the cluster, the cluster status may be checked in a cluster card.

Figure 7:

The cluster map function provides a view capable of visualizing and managing a configuration and status information of the cocktail server (application) in a map form (see FIG. 7).

The cluster map queries/manages a configuration of a server of the cluster and a cloud component in a map form to enhance visibility of the configuration information. The cluster map may include items such as a cocktail server, a cloud component, and a server group.

The cocktail server is configured by a load balancing, an application container, and an infrastructure as a basic unit of the application orchestration, and provides an interface standardized for multi/hybrid cloud management. The cocktail server verifies an application status and replication, and a resource usage in the server and manages scaling, rolling update, etc. The cocktail server is divided into multi and single instance types according to presence or absence of a replication function. In AWS, a multi-zone option is supported.

The cloud component manages PaaS services provided by a provider. For example, the cloud component may be RDS as a DB service of AWS.

A server group provides a logical group of a server configuration to management convenience.

Figure 8:
Figure 9:
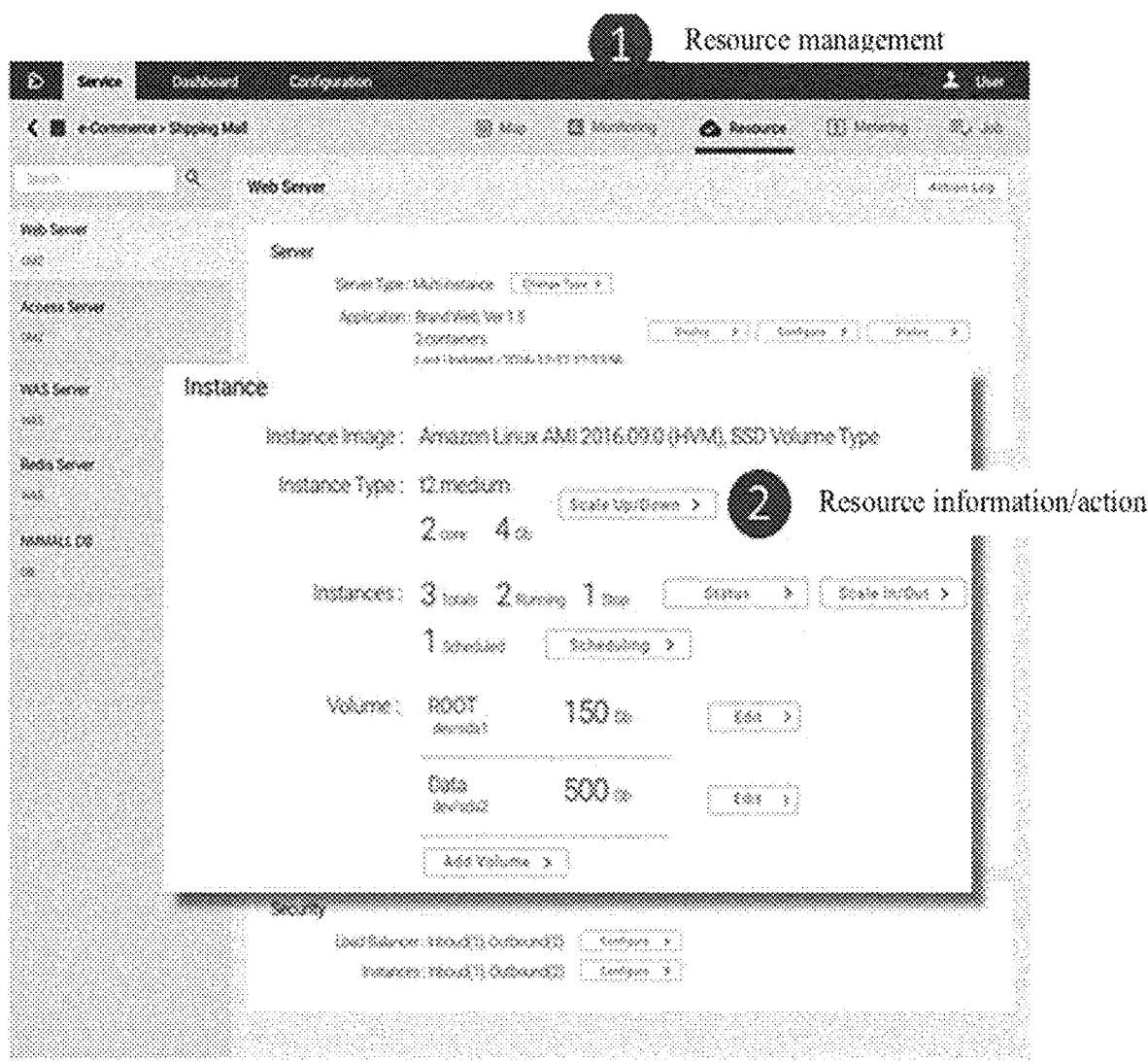
Figure 10:

The monitoring view function provides information capable of verifying resource capacity and status of the application and the infrastructure in the cluster and verifying a status of a cloud resource (see FIG. 8).

The monitoring view visualizes and provides the monitoring information on the application and infrastructure in the cluster and checks a usage of resources by providing a CPU, a memory, an average of the disk, and TOP information to correspond to operation.

The monitoring view may include a view conversion (trend/data) item, a target conversion (server/resource), etc.

In view conversion item, a trend view provides monitoring information for each time for the server, the replicated instance, and the application container and the data view provides an average of the current time, and a TOP monitoring value.

In the target conversion item, a monitoring target is divided into a server in the cluster and a resource of the cloud infrastructure. The cloud resource uses information provided by the supplier.

The resource management function checks a resource of the cloud infrastructure configuring the application and provides a view (hereinafter, referred to as a "resource management view") capable of adjusting detailed settings if necessary.

The resource management view may check a cloud infrastructure resource configuring the cocktail server and change settings specifically. Here, the cocktail server automatically performs a basic configuration for the application orchestration, but is used when there is a need for adjusting a cloud resource directly if necessary.

The resource management view includes a resource information/action item and the application of the resource information manages container configuration and deployment information. The cloud resource information consists of a load balancer, an instance (VM), and security, and the instance manages a capacity and a volume. Resource information required for adjustment is performed through an action.

The metering function provides a view (hereinafter, referred as a "metering view") capable of checking cost information of the cloud infrastructure resource used for the application. The metering view may include a cluster infrastructure use cost item, a server, a cost item for each resource, and the like.

In the cluster infrastructure use cost item, the cluster and the cocktail server may check a cost status of the using cloud resource and provide previous month and current month cost information, and next month estimation cost. Further, a cost increase and decrease trend graph is provided for each month.

Cost items for each server and each resource provide cloud resource cost used for each cocktail server based on TOP and provide cost used for cloud resource type based on TOP.

Figure 11:
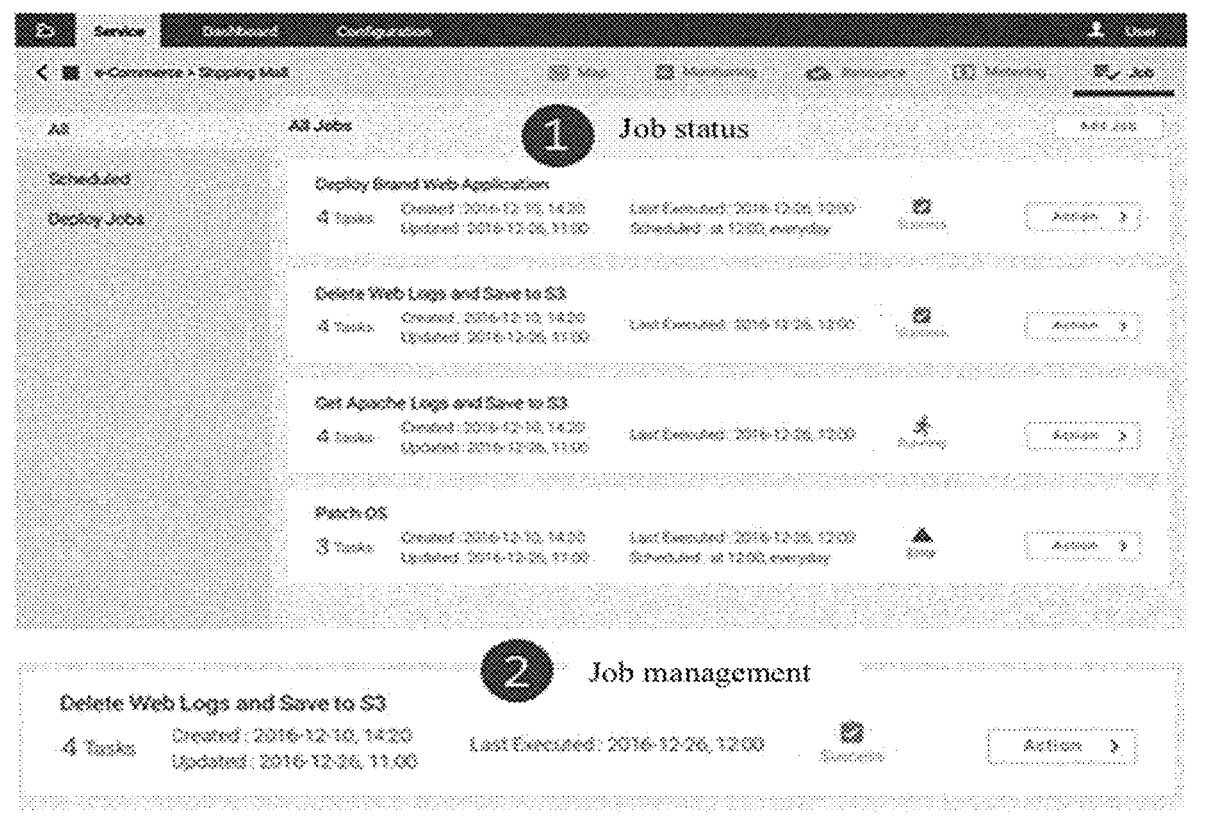

The operation management function provides a management view (hereinafter referred to as an "operation management view") capable of scheduling/automating an operation such as deployment, a remote command, and resource management (see FIG. 11).

The operation management view provides scheduling and batch-processing for operating the applications and the infrastructure. The operation management view may include a job status item, a job management item, etc.

In the job management view, the job status item is divided into deployment, a remote command, and a resource management task and configured by combining respective tasks.

Here, the deployment refers to application deployment, the remote command means performing an OS command in remote, and the resource management means scaling, and a status/setting change.

In the job management view, the job management item may set a performing method according to immediately performing, scheduling, and occurrence of the alarm. The performance according to the occurrence of the alarm is used in automatic scaling according to a reference value of the capacity monitoring. In the job management item, an execution state and a log check of the job are provided.

The enterprise status management/analysis function provides a cocktail dashboard capable of determining and analyzing an enterprise application, a cloud, and a cost situation.

The cocktail dashboard is a view of querying a status of the application and the cloud infrastructure in the enterprise level and providing cost/budget management, cost optimization analysis, and statistics reports. The cocktail dashboard may include an application status item, a cloud status item, a cost/budget management item, a cost optimization analysis item, and a statistics/report item.

It is possible to enterprisely determine and query application and infrastructure statuses based on standardized elements of the cocktail server, the cluster, and the cloud component through the application status item and provide a status view based on the service.

The cloud status item may determine a status of a cloud used for the enterprise for each provider, each region, and each resource and provides an infrastructure-based status.

The cost/budget management and cost optimization analysis items determine an enterprise cloud cost situation and provide information capable of efficienating cloud resource cost by budget allocation/control and optimized analysis for each service.

The statistics/report item provides statistical information and a report view required for analysis and reporting.

In the DB/storage 150, an image storage (registry) 180 manages registration, share, download, search, version of the application container, a monitoring DB 170 manages monitoring information of the application and the infrastructure, and an integral configuration DB (configuration management DB, CMDB) 160 manages configuration information of a provider, a network, a service, a cluster, a server, a component, and a cloud resource.

Figure 12:
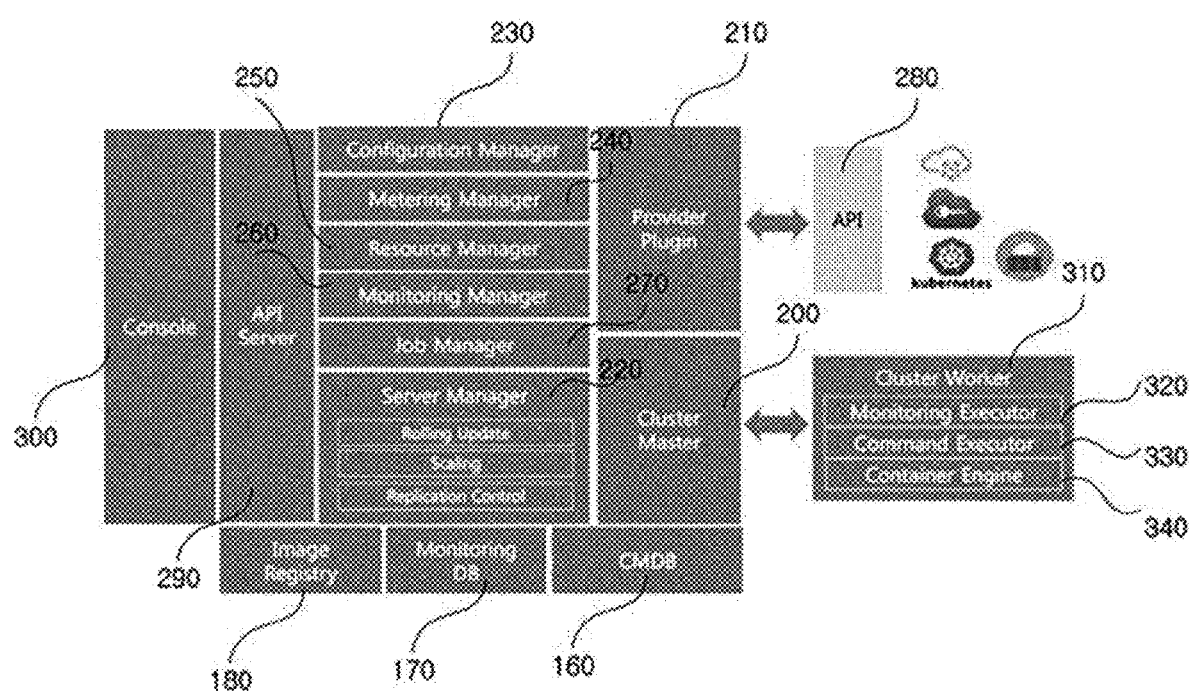
FIG. 12 illustrates an architecture of a cloud platform system according to an embodiment of the present invention.
Figure 13:
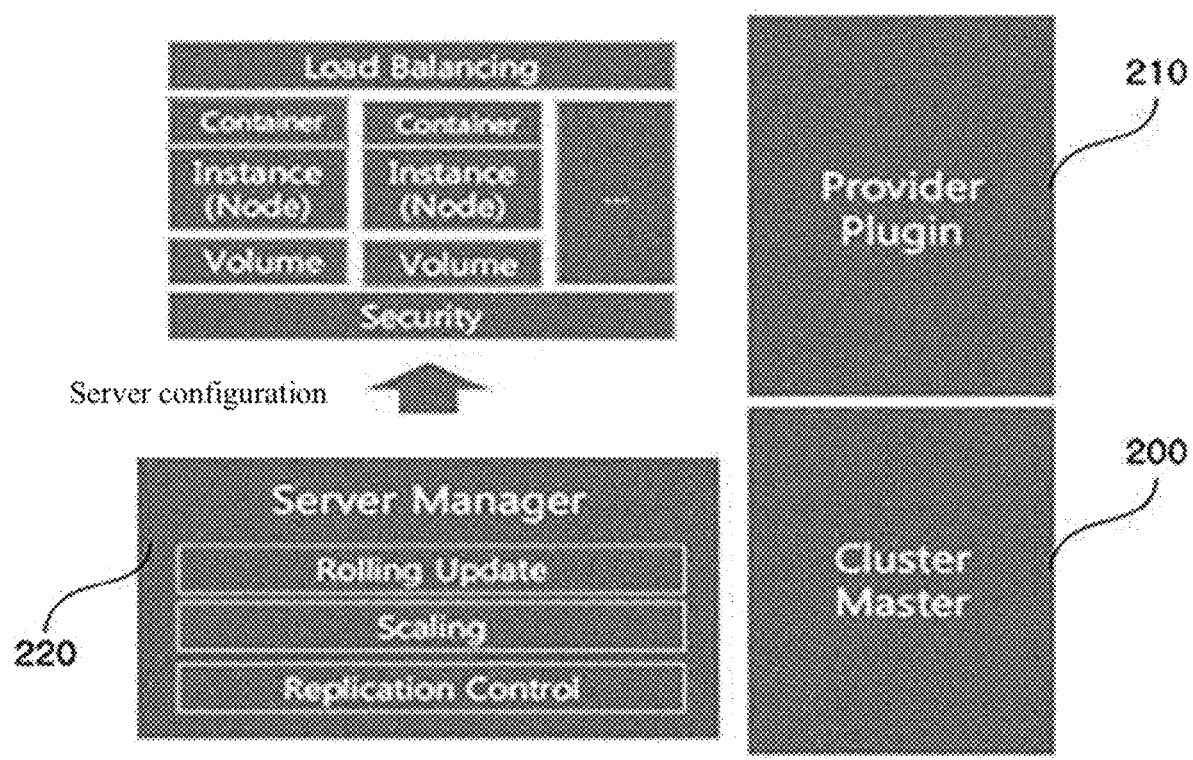
FIG. 13 illustrates a configuration of a cocktail server and surrounding architectures thereof.

FIG. 12 illustrates an architecture of a cloud platform according to an embodiment of the present invention, and FIG. 13 illustrates a configuration of a cocktail server and surrounding architectures thereof.

Referring to FIG. 12, a cocktail cloud includes a cocktail cluster 200, a provider plug-in 210, a server manager, 220, a DevOps manager, a CMDB 160, a monitoring DB 170, an image registry 180, an API server 290, and a user console 300.

The cocktail cluster 200 provides an orchestration-based architecture and the provider plug-in 210 is used as a basic module for integral management by a cloud provider API 280.

The cluster 200 is constituted by a node and a master and the node is a structure of processing a command of the master by a worker 310. The worker 310 is responsible for communication with the master and an executor is supported by an execution command. A monitoring executor 320 collects node and container monitoring information and a command executor 330 performs an OS and a container command. In addition, a container engine (docker) 340 is included.

The provider plug-in 210 is an API rapper for supporting Kubernetes API for a multi-cloud and Bare Metal and is configured by a plug-in module for provider extension. The cocktail server is a basic unit of the application orchestration and performs replication, scaling, and rolling update of the container and the cloud infrastructure by the cluster master 200 and the provider plug-in 210.

The cocktail server is constituted by a container and a cloud infrastructure as illustrated in FIG. 13, and constituted by a load balancer, an instance (node), a container, a volume, and security, and may be, for example, ELB, EC2 Instance, Security Group, and ESB of AWS. The cocktail server provides a cloud component for PaaS of the cloud provider. For example, the cocktail server may be RDS of AWS.

The server manager 220 is a control module of performing orchestration of an application container and an infrastructure in the server, and provides a replication control to restart/recover a container abnormally terminated, scaling of performing scale in/out and up/down through an instance type and a volume extension, and a rolling update function of performing non-disruptively an application container deployment sequentially.

The DevOps manager, as a manager module of DevOps, provides a configuration manager 230 for provisioning a multi-cloud infrastructure, a metering manager 240 for managing a usage and cost of a multi-cloud resource, a resource manager 250 for managing a resource status and settings of the multi-cloud, a monitoring manager 260 for collecting and managing container/infrastructure monitoring information, and a job manager 270 for a task of deployment, a server action, and a remote command in which various job tasks are combined and integrally performed and immediate performance, a performance time, and event occurrence are performance conditions.

The cocktail cloud provides a DB for managing configuration information of an application and an infrastructure, monitoring information, and an application container image and provides a user and an interface for programming.

The CMDB 160 manages configuration information of a provider, a network, a service, a cluster, a server, a component, and a cloud resource.

The monitoring DB 170 manages monitoring information of the application and the infrastructure.

The image registry 180 manages registration, share, download, search, version of the application container.

The API server 290 provides all functions of the cocktail cloud to the API 280 and supports customization according to a corporate strategy and association with other solutions.

The user console 300 is provided in a form of Web GUI.

The cocktail cloud may be used as follows.

First, the cocktail cloud may be used as a multi-cloud.

The cocktail cloud is a platform for integral management of a heterogeneous and complex multi-cloud environment by a standardized component and implements the entire business cloud quantity based on the application. Specifically, the cocktail cloud is a standardized management component for standardizing a managing target by the provider, the network, the service, the cluster, the server, and the cloud component and integrally managing a heterogeneous and complex multi-cloud resource (integral account, resource, and cost). Further, the application is a core resource of the business, and the availability and extendability of the application are enhanced by the cocktail cluster and a development/operation work is efficienated by the cocktail DevOps View, thereby implementing a business cloud based on the application.

Second, the cocktail cloud provides an infrastructure of construction/operation of a hybrid cloud by cloudifying Bare Metal infrastructure within an office and a data center. The cocktail cloud also provides integral management and development/operation efficiency of a hybrid complex infrastructure.

Specifically, the application cluster is configured in the Bare Metal infrastructure in the office and the data center to construct a container-based cloud environment, so that a separate platform for virtualization is not required, availability and extendability of scaling, etc., are provided, and a cloudifying of a physical infrastructure capable of integrally managing existing private and public clouds may be implemented.

Also, the cocktail cloud is managed by a standard component of the cocktail cloud and provides development/operation task efficiency by the cocktail cloud DevOps view.

Third, the cocktail cloud provides a platform for efficient management of the application on the cloud and constructing and operating a micro service through automation for the container and CI/CD.

The cocktail cluster provides an application deployment and management environment (cloud-native application) in a cloud infrastructure based on the container. Here, the cocktail cluster is a basic unit of constructing and managing the micro service.

Job management of the cocktail DevOps view provides an automated infrastructure capable of building and deploying the application and the container may be lighter and easier to perform the CI/CD. The cocktail cloud provides a platform that may deploy/operate applications on a multi/hybrid cloud.

Fourth, the cloud cocktail may be used also as an infrastructure resale and service providing platform of a cloud service broker.

The cloud cocktail constructs and operates a CSB platform which manages integrally a public cloud and a data center infrastructure and provides a resale and cloud management platform to a user in a service form, provides a multi-tenancy and billing system for SaaS, and can be used as a platform for providing and managing affiliate clouds in the case of large-scale enterprises.

Also, the cloud cocktail cloudified and provides an infrastructure of an existing data center provider and provides a service (cocktail cloud component (PaaS)) specified to a public cloud provider.

Figure 14:
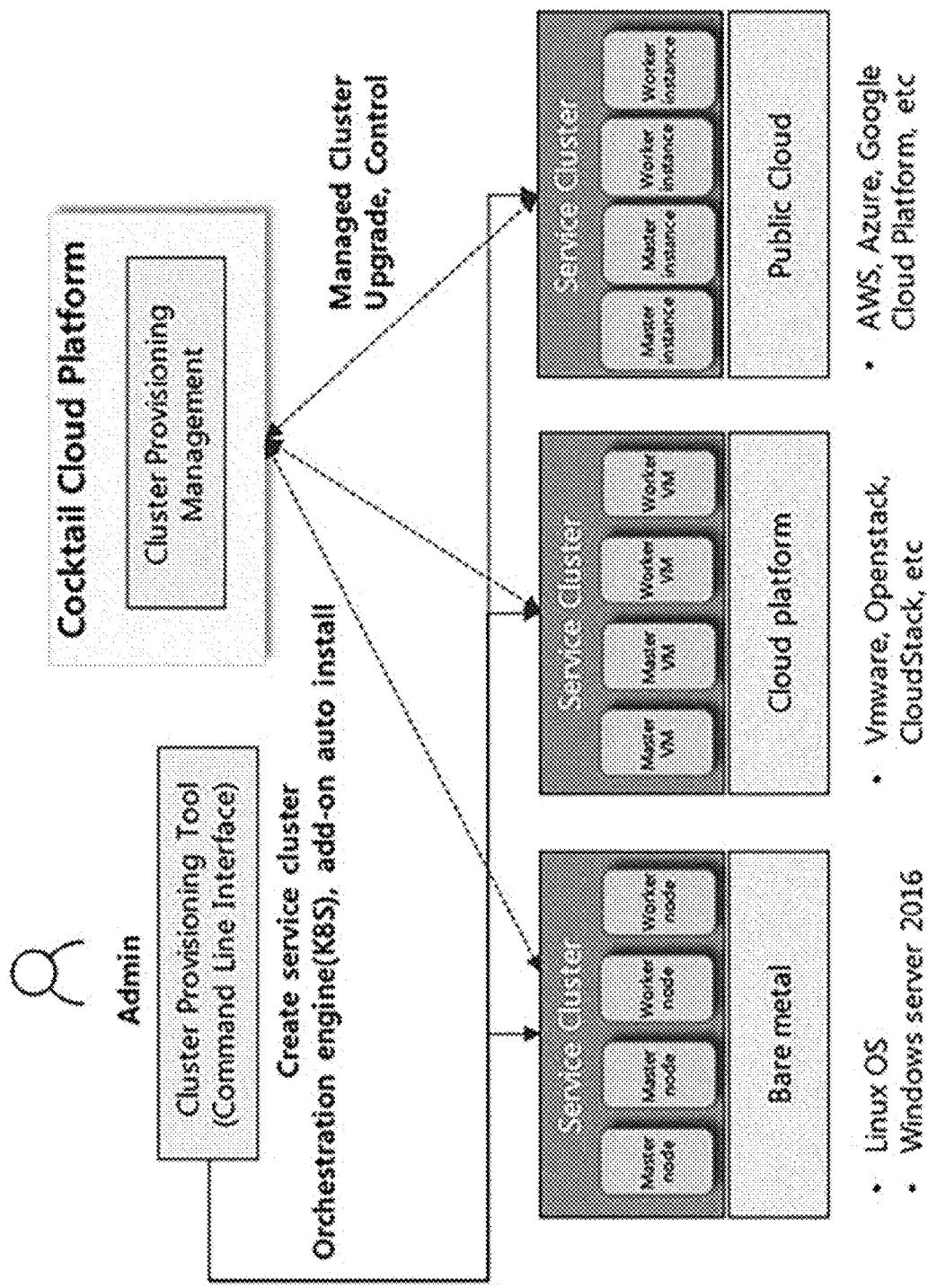
FIGS. 14 to 16 are diagrams for describing a multi-cluster provisioning and management function in a cloud platform system according to an embodiment of the present invention.
Figure 15:
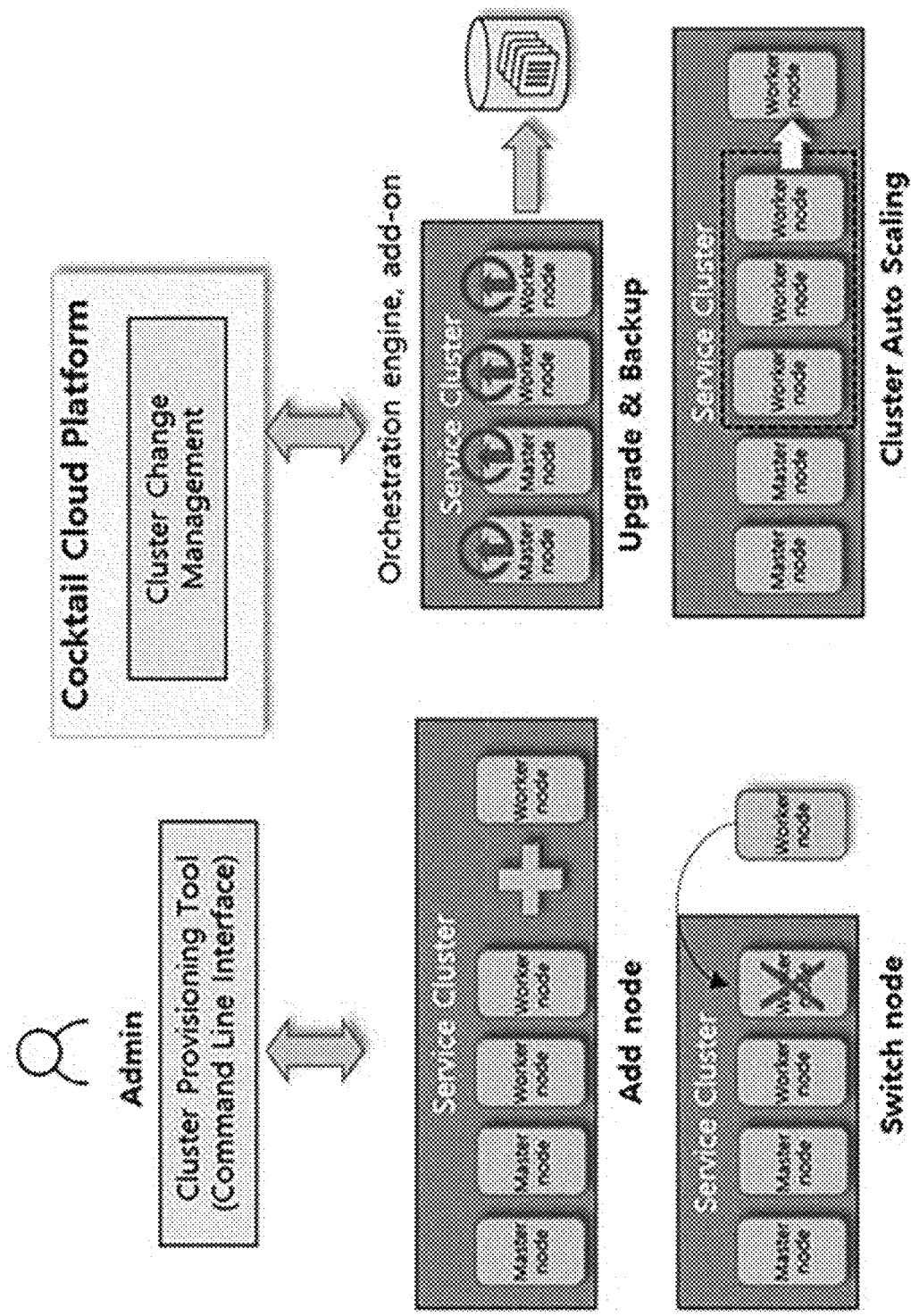
Figure 16:
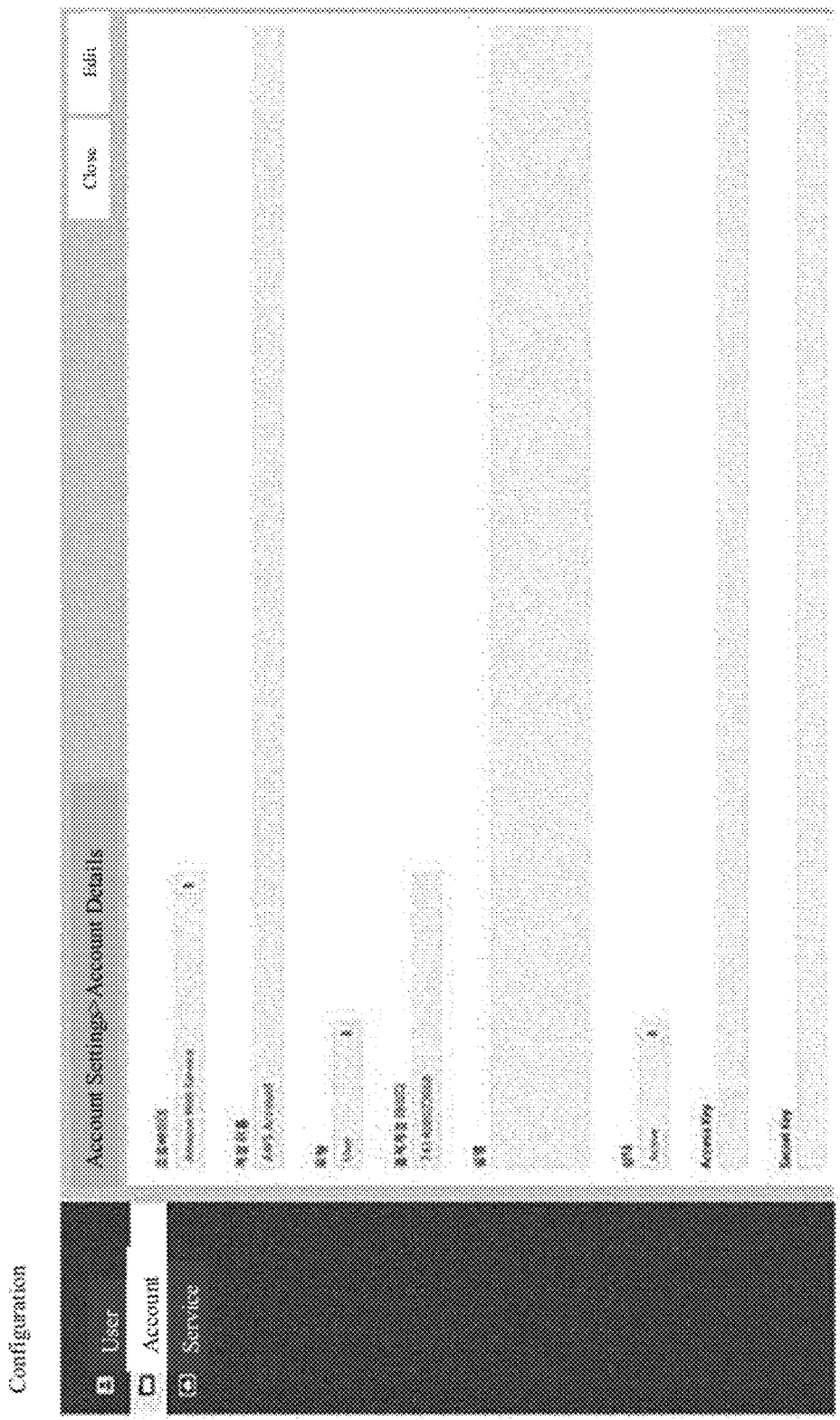

FIGS. 14 to 16 are diagrams for describing a multi-cluster provisioning and management function of a cloud platform system according to an embodiment of the present invention.

A cocktail cloud, which is a cloud platform system according to the present invention, provides a multi-cluster provisioning and management function that automatically generates a cluster environment in which container-based applications may operate on various infrastructures such as bare metal, cloud platform, and public cloud. This function is to generate a container application operating environment by simultaneously provisioning a plurality of clusters remotely from the center (cocktail cloud) in a multi-cloud environment, and manage version upgrade of the cluster remotely to improve operational efficiency (see FIG. 14).

Referring to FIG. 15, when the version of the cluster is upgraded, the latest functions of Orchestration engine and add-on are reflected, and a cluster node may be easily added and a failed node may be replaced using a CLI tool. In addition, cluster node backup is enabled, and cluster automatic scaling is also enabled.

FIG. 16 illustrates an example screen on which application deployment, operation management, and cluster monitoring functions may be performed by registering account information of a public cloud in which a cluster is configured to control the cluster remotely.

Figure 17:
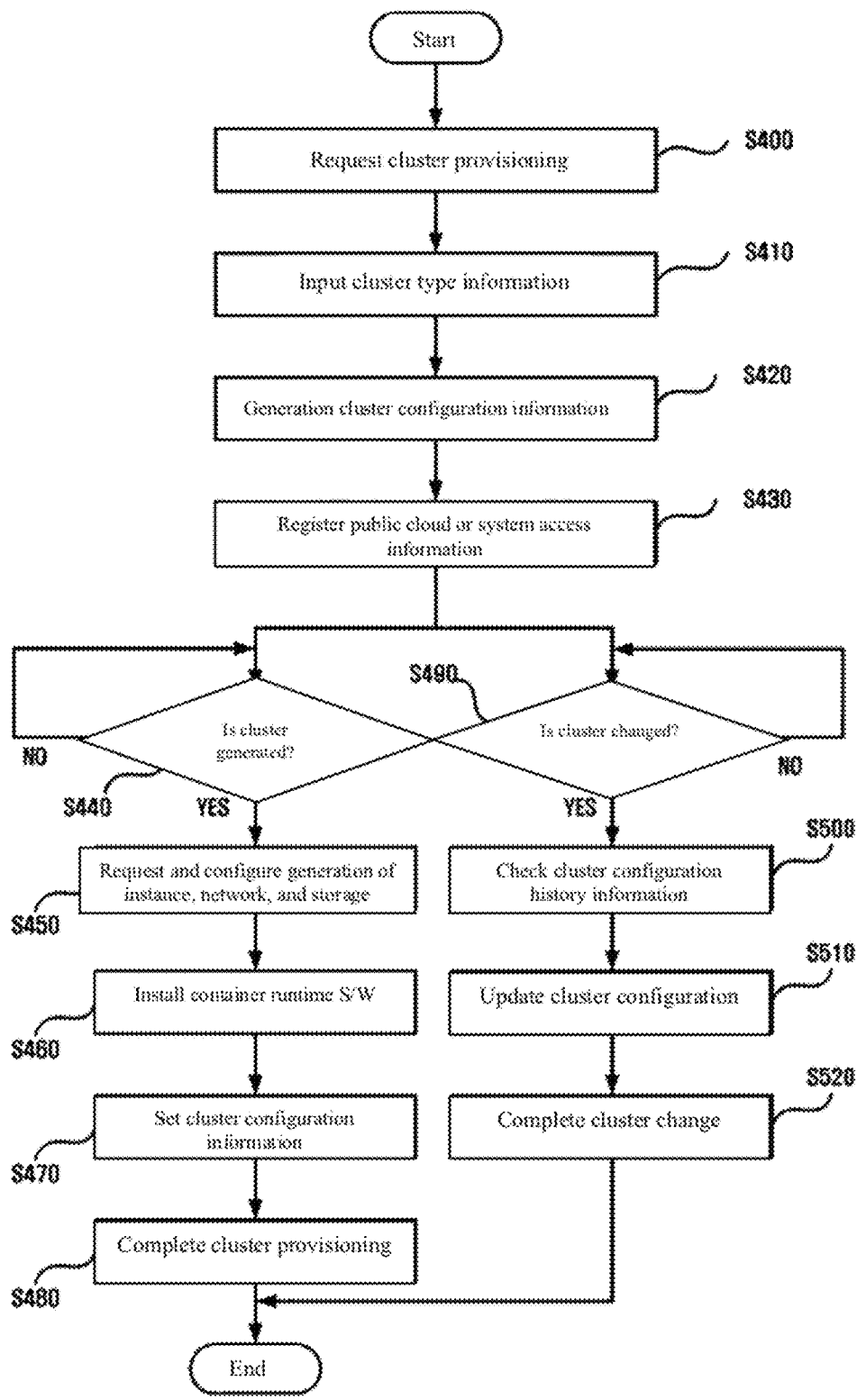
FIG. 17 is a flowchart illustrating a method for provisioning and managing a multi-cluster in a cloud platform system according to an embodiment of the present invention.

FIG. 17 is a flowchart illustrating a method for provisioning and managing a multi-cluster of a cloud platform system according to an embodiment of the present invention.

A provisioning and management tool that may be input by a user is provided for multi-cluster provisioning and management.

When a user's cluster provisioning is requested by the provisioning and management tool (S400), the cloud platform system may input cluster type information (e.g., Bare-metal, public cloud, cloud platform, etc.) (S410). When the cluster type information is input by the user, cluster configuration information is generated (S420). Specifically, the cluster configuration information includes at least one of the number of instances, instance specifications (GPU, memory type), network configuration information, and storage configuration information.

Next, when a public cloud or system access information (access account information, authentication information) is registered (S430), the cloud platform system checks whether to generate or change a cluster (S440 and S490).

If the cluster is generated, the cloud platform system requests and configures generation of an instance, a network, and a storage (S450). Thereafter, container runtime software is installed (S460). In addition, the cluster configuration information is set (S470). Then, the cluster provisioning is completed (S480).

If the cluster is changed, the cloud platform system checks cluster configuration history information and updates the cluster configuration (S500 and S510). Then, the cluster change is completed (S520).

Meanwhile, the cloud platform system according to an embodiment of the present invention is developed, tested, and operated by an administrator for each service or organization, and provides a cluster resource allocation management function that allocates a cluster infrastructure according to a resource availability for each cluster.

Figure 18:
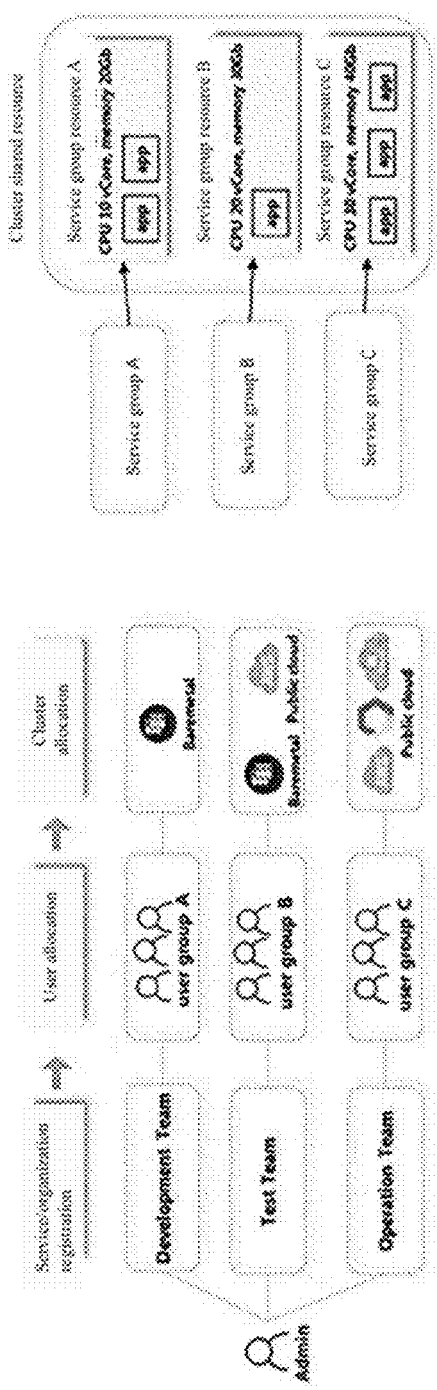
FIG. 18 is a diagram for describing a cluster resource allocation management function in a cloud platform system according to an embodiment of the present invention.

FIG. 18 is a diagram for describing a cluster resource allocation management function of a cloud platform system according to an embodiment of the present invention.

As illustrated in FIG. 18, when a service/organization-specific usage group is registered and a user belonging to the service/organization is allocated, in the cloud platform system allocates the cluster to the allocated user. At this time, the cloud platform system queries and allocates available cluster resources, and a service/organization-specific cluster resource amount is limited and managed.

Figure 19:
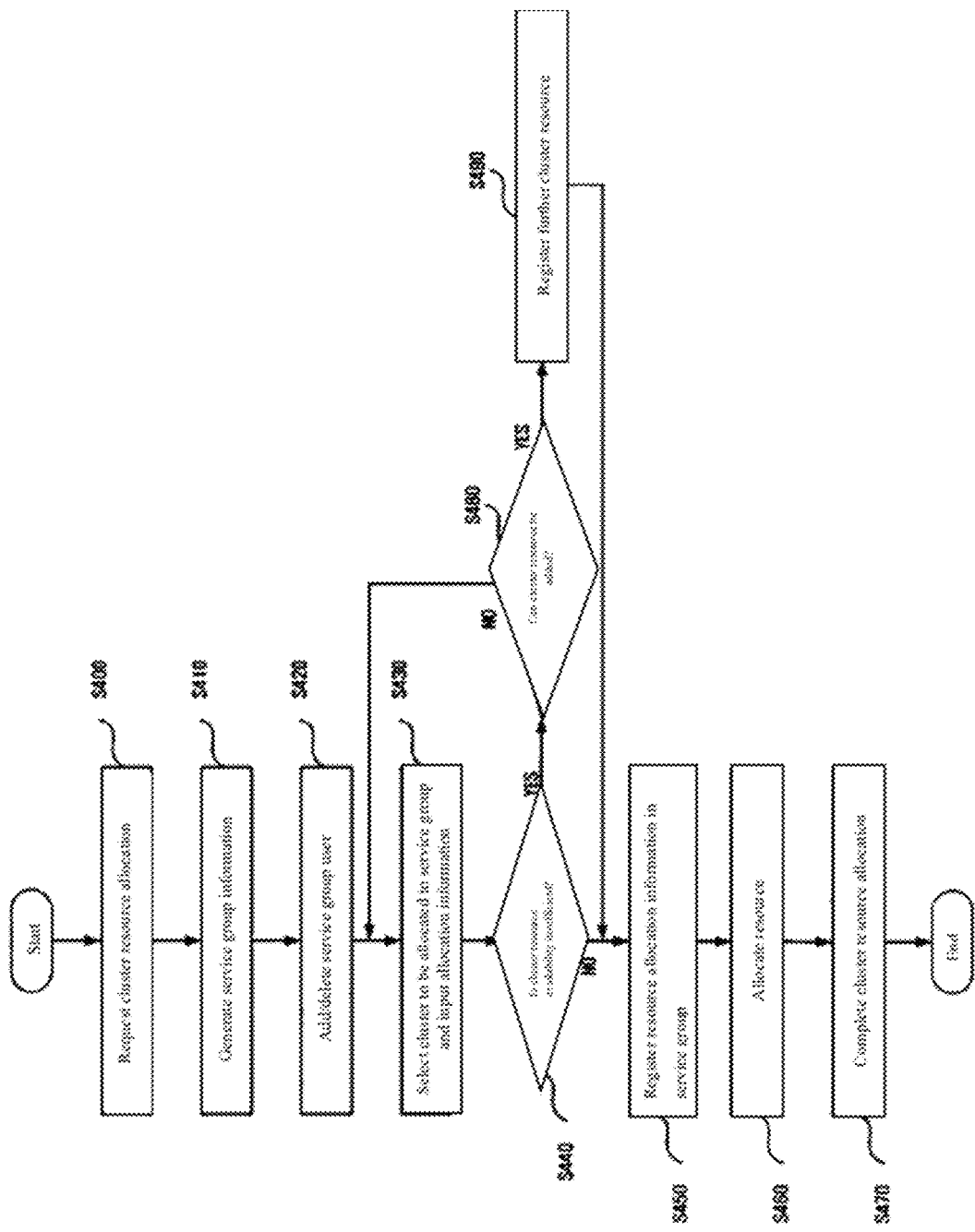
FIG. 19 is a flowchart illustrating a method for allocating a cluster resource in a cloud platform system according to an embodiment of the present invention.

FIG. 19 is a flowchart illustrating a cluster resource allocation method in a cloud platform system according to an embodiment of the present invention.

As illustrated in FIG. 19, when a cluster resource allocation request is input (S400), service group information is generated (S410). A user in a service group may be added/deleted (S420).

A cluster to be allocated to the next service group is selected, and allocation information (e.g., CPU, memory resource allocation) is input (S430).

Then, the cloud platform system queries a cluster resource availability (S440).

If the resource is available, the cloud platform system registers resource allocation information in the service group and allocates the resource (S450 and S460). Accordingly, the cluster resource allocation is completed (S470).

If the resource is insufficient, the cloud platform system checks whether the cluster resource is added (S480). If the cluster resource can be added, the cloud platform system additionally registers the cluster resource (S490). Thereafter, the cloud platform system registers resource allocation information in the service group and allocates the resource to complete the cluster resource allocation (S450, S460, and S470).

If the cluster resource cannot be added, the process returns to step S430 to reselect an available cluster.

Figure 20:
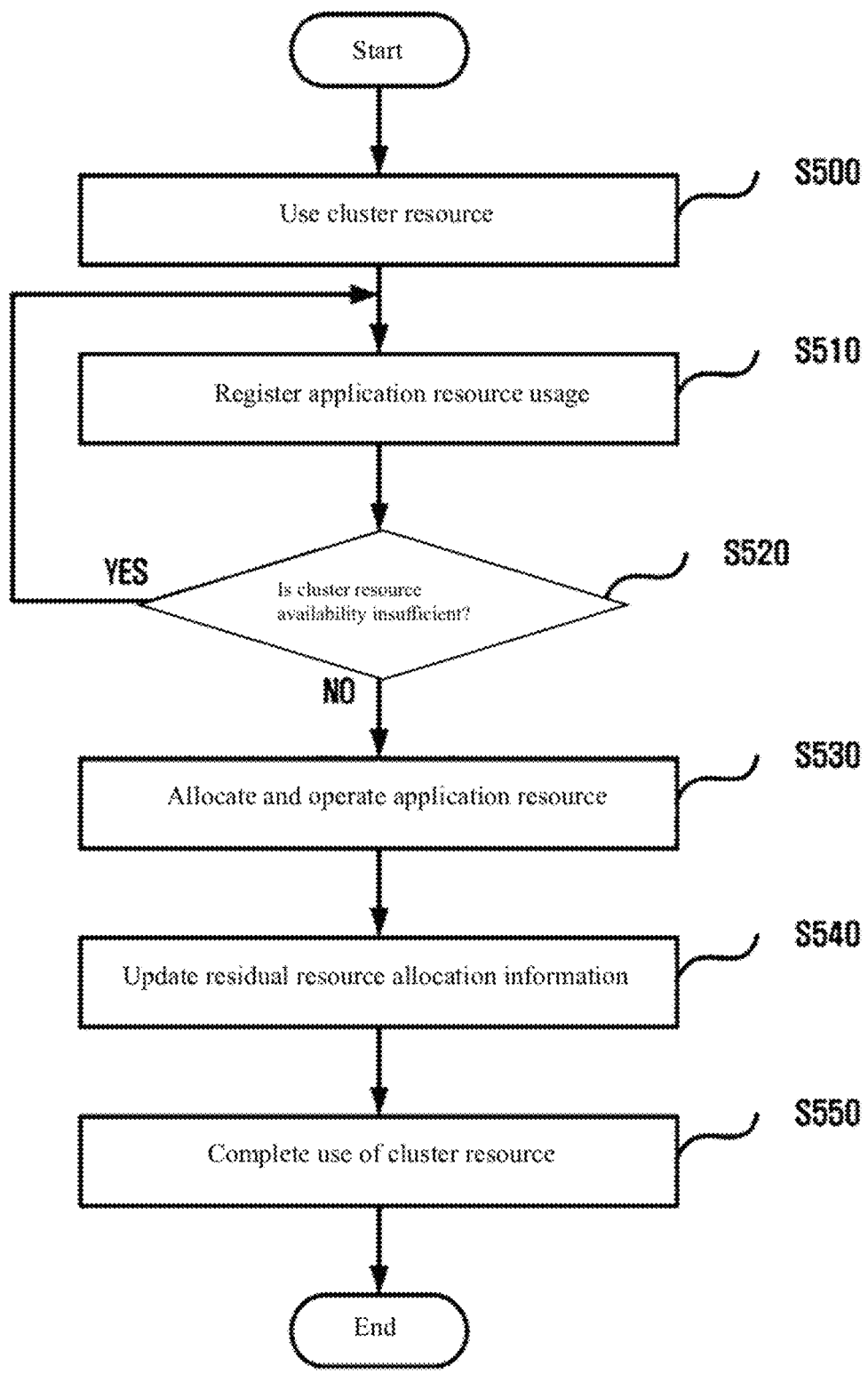
FIG. 20 is a flowchart illustrating a method for using a cluster resource in a cloud platform system according to an embodiment of the present invention.

FIG. 20 is a flowchart illustrating a method for using a cluster resource in a cloud platform system according to an embodiment of the present invention.

First, an application resource usage is registered to use a cluster resource (S500 and S510).

The cloud platform system queries the cluster resource availability (S520).

If the resource can be used, the application resource is allocated and operated (S530). At this time, the application resource usage status is monitored and controlled.

Then, the residual resource allocation information is updated (S540). Then, the use of the cluster resource is completed (S550).

Figure 21:
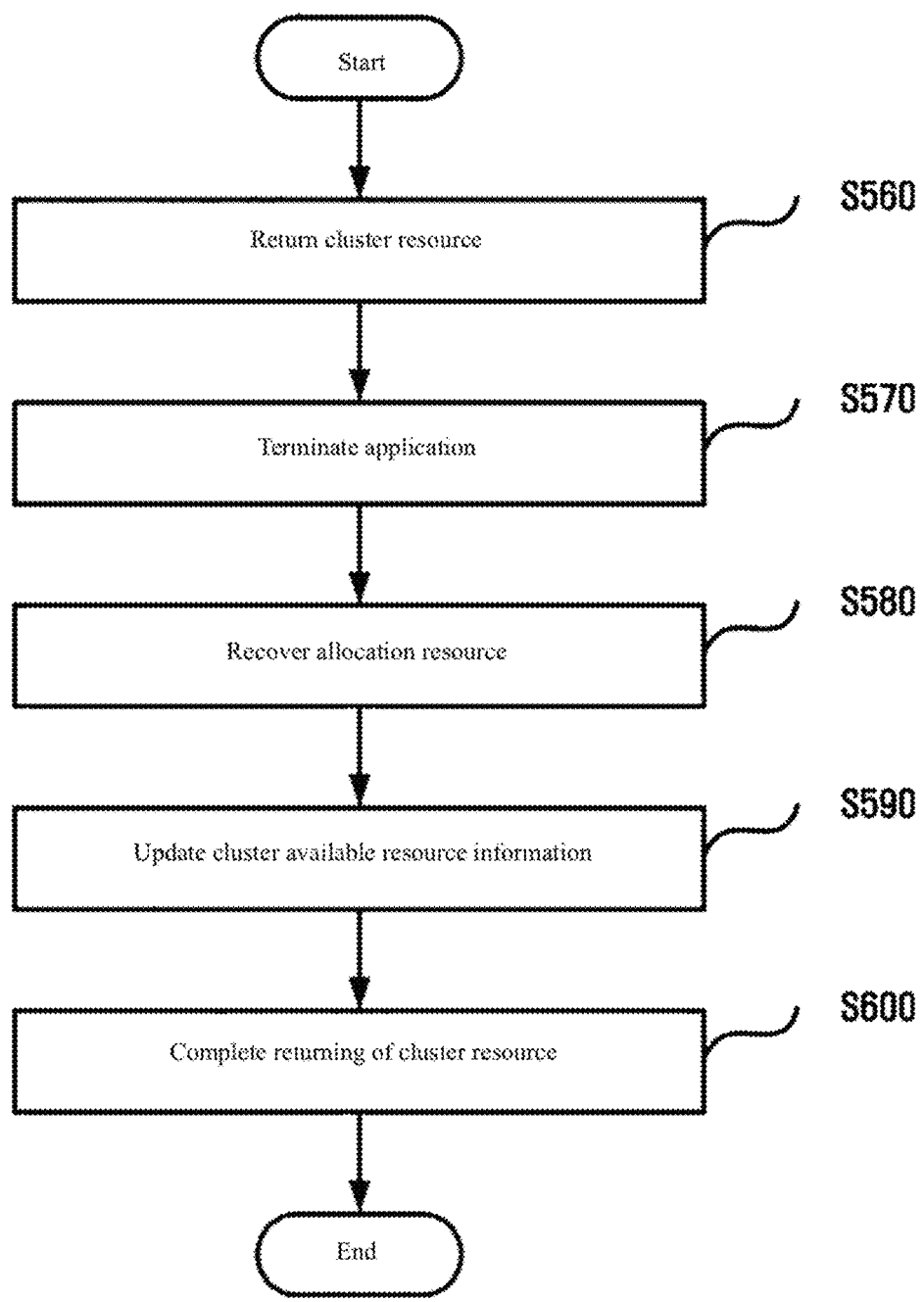
FIG. 21 is a flowchart illustrating a method for returning a cluster resource in a cloud platform system according to an embodiment of the present invention.

FIG. 21 is a flowchart illustrating a method for returning a cluster resource in a cloud platform system according to an embodiment of the present invention.

The application is terminated to return the cluster resource (S560 and S570).

The cloud platform system recovers the allocated resource (S580), and updates cluster available resource information (S590). Then, the returning of the cluster resource is completed (S600).

Meanwhile, the embodiments of the present invention may be prepared by a computer executable program and implemented by a universal digital computer which operates the program by using a computer readable recording medium. The computer readable recording medium includes storage media such as magnetic storage media (e.g., a ROM, a floppy disk, a hard disk, and the like), optical reading media (e.g., a CD-ROM, a DVD, and the like), and a carrier wave (e.g., transmission through the Internet).

As described above, according to the method for containing an application in a cloud platform of the present invention, it is possible to provide an isolated application execution environment, independently allocate resources, operate multiple applications on the same host and enabling a fast operation with OS-level virtualization, be efficient in deployment and updating to a small size of container image, and be movable anywhere.

In addition, according to the method for provisioning and managing the multi-cluster in the cloud platform according to the present invention, it is possible to automatically generate a multi-cluster environment in which container-based applications can operate on various infrastructures, and to improve operational efficiency by remotely managing version upgrade of the cluster.

The present disclosure has been described above with reference to preferred embodiments thereof. It is understood to those skilled in the art that the present disclosure may be implemented as a modified form without departing from an essential characteristic of the present disclosure. Therefore, the disclosed embodiments should be considered in an illustrative viewpoint rather than a restrictive viewpoint. The scope of the present disclosure is defined by the appended claims rather than by the foregoing description, and all differences within the scope of equivalents thereof should be construed as being included in the present disclosure.

The invention claimed is:

1. A method for allocating and managing a cluster resource on a cloud platform, the method comprising the steps of:
    generating service group information, by a cloud platform system, when a cluster resource allocation request is input;
    adding/deleting a user of the service group, by the cloud platform system;
    selecting a cluster to be allocated to the user of the service group and inputting allocation information;
    querying a cluster resource availability, by the cloud platform system;
    registering resource allocation information in the service group and allocating a resource to complete cluster resource allocation, by the cloud platform system, in response to the resource is determined to be available by the querying of the cluster resource availability, wherein the resource allocation information includes CPU (Central Process Unit) and memory allocation information;
    checking whether a cluster resource is added, by the cloud platform system, in response to the resource is determined to be insufficient by the querying of the cluster resource availability;
    registering further the cluster resource, by the cloud platform system, in response to the cluster resource is determined to be able to be added by the checking of whether the cluster resource is added;
    registering the resource allocation information in the service group and allocating the resource to complete the cluster resource allocation, by the cloud platform system; and
    reselecting an available cluster in response to the cluster resource is determined to be unable to be added by the checking of whether the cluster resource is added.

2. The method of claim 1, further comprising the steps of:
    registering an application resource usage for using the cluster resource;
    querying the cluster resource availability, by the cloud platform system;
    allocating and operating an application resource, by the cloud platform system, when the resource is able to be used;
    updating residual resource allocation information, by the cloud platform system; and
    completing the use of the cluster resource.

3. The method of claim 1, further comprising the steps of:
    terminating an application for returning the cluster resource;
    recovering an allocation resource, by the cloud platform system;
    updating cluster available resource information, by the cloud platform system; and completing the returning of the cluster resource.

* * * * *